United States Patent [19]

Lassander et al.

[11] Patent Number: 4,550,413
[45] Date of Patent: Oct. 29, 1985

[54] SYMMETRICAL CURRENT CONDUCTOR SYSTEM FOR A DC ARC FURNACE

[75] Inventors: Erik Lassander, Viken; Sven E. Stenkvist, Västerås, both of Sweden

[73] Assignee: ASEA Aktiebolag, Västerås, Sweden

[21] Appl. No.: 601,346

[22] Filed: Apr. 17, 1984

[30] Foreign Application Priority Data

Apr. 21, 1983 [SE] Sweden .............................. 8302249

[51] Int. Cl.$^4$ .............................................. H05B 7/11
[52] U.S. Cl. ...................................... 373/108; 373/72
[58] Field of Search ...................... 373/69, 71, 72, 88, 373/94, 103, 108

[56] References Cited

U.S. PATENT DOCUMENTS

| | | | |
|---|---|---|---|
| 3,676,564 | 7/1972 | Fujiwara | 373/103 |
| 4,228,314 | 10/1980 | Stenkvist | 373/72 |
| 4,324,943 | 4/1982 | Stenkvist et al. | 373/72 |
| 4,403,328 | 9/1983 | Lassander et al. | 373/108 X |
| 4,425,658 | 1/1984 | Bretthauer et al. | 373/103 |
| 4,435,817 | 3/1984 | Krossrud | 373/103 |

FOREIGN PATENT DOCUMENTS 0096681 5/1983 European Pat. Off. ............ 373/108

*Primary Examiner*—A. D. Pellinen
*Assistant Examiner*—Hong K. Choe
*Attorney, Agent, or Firm*—Kenyon & Kenyon

[57] ABSTRACT

A DC arc furnace has a side wall and an electrically conductive hearth, a roof on top of the side wall and over the hearth, an arcing electrode depending through the roof, a plurality of electrical hearth connections extending from the hearth, a first DC power conductor connecting with the hearth connections to provide current and therefore magnetic field symmetry preventing arc deviations, the first and second conductors are extended from a position horizontally offset from the furnace to a point below the hearth and aligned vertically with the electrode, the first conductor forming at least two branches which extend from the point horizontally in opposite directions to beyond the side wall and upwardly so as to jointly connect with the arcing electrode, the second conductor forming at least two branches which extend horizontally from the point in opposite directions with one branch connecting with one of the hearth connections and the other branch connecting with the other one of the hearth connections.

1 Claim, 1 Drawing Figure

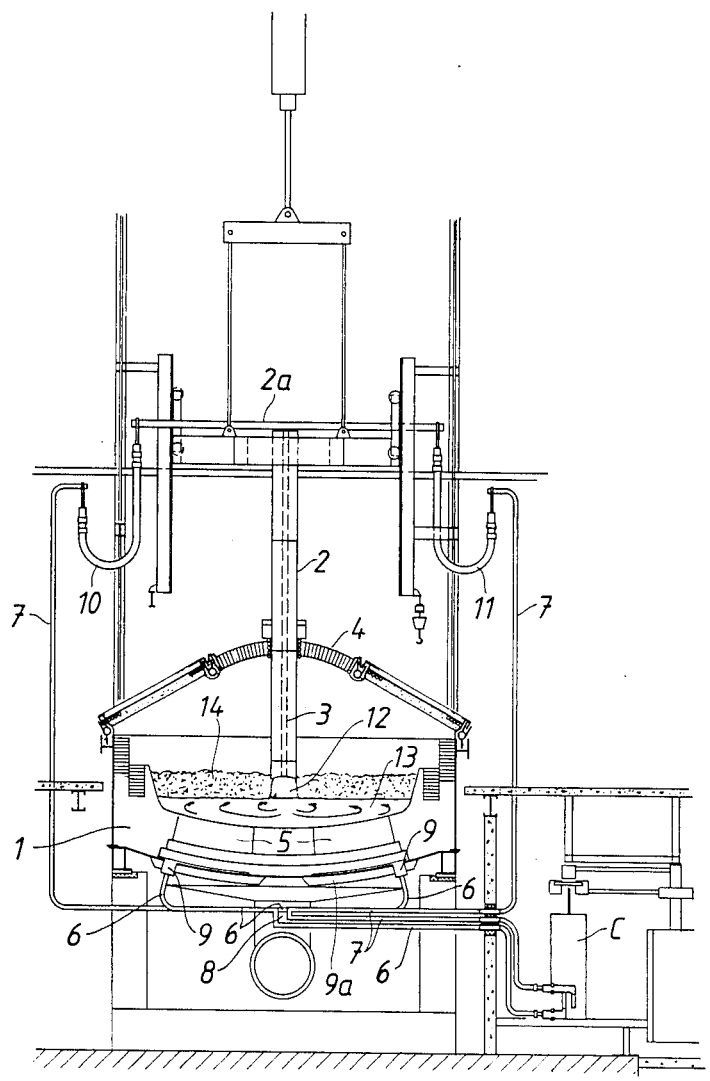

SYMMETRICAL CURRENT CONDUCTOR SYSTEM FOR A DC ARC FURNACE

BACKGROUND OF THE INVENTION

A DC arc furnace basically comprises a cylindrical side wall extending upwardly from the periphery of a circular hearth and having a roof on its top. At least one consumable arcing electrode depends from the center of the roof for forming an arc with a melt on the hearth. At least a portion of the hearth is electrically conductive throughout an area that is symmetrical with the arcing electrode axis. U.S. Pat. Nos. 4,228,314 and 4,324,943 disclose such an arc furnace. The electrode, side wall and hearth are symmetrical with respect to the electrode axis, and the DC power conductor connections for the hearth are likewise symmetrically positioned.

The arc academically should burn vertically in alignment with the electrode when DC power conductors are connected to the electrode and hearth connections to power the arc. Practically, this result is not achieved because the strong magnetic fields of the power conductors cause the arc to burn angularly with its arc flare directed destructively against the side wall.

The furnaces disclosed by the previously mentioned patents are of the rocking type having a removable roof and equipment for lifting the electrode and removing the roof when the furnace is rocked for tapping a melt formed in the hearth. Such a furnace can be used not only as a metal-oxide reduction furnace but also as a scrap melting furnace when using a solid electrode. For this type U.S. Pat. No. 4,403,328 discloses a DC power conductor connection system providing conductor symmetry not previously possible, preventing the power conductor magnetic fields from appreciably affecting the arc.

Non-rocking DC arc furnaces are used when only the direct reduction of metal-oxide is required, and can be made basically as disclosed by the initially mentioned two patents but with a non-removable roof and without the roof-removing equipment mentioned by U.S. Pat. No. 4,403,328. A tubular consumable arcing electrode for feeding the metal-oxide to the hearth is required and tapping is via a side tapping port, the reduced melt continuously being produced by continuous feeding through the electrode.

SUMMARY OF THE INVENTION

The present invention provides a completely symmetrical current conducting system for DC arc furnaces of this non-rocking type and which prevents arc disturbance caused by the fields of the DC power conductors powering the arcing electrode and the conductive hearth.

The invention is applicable to any non-rocking DC arc furnace having a cylindrical side wall and a circular electrically conductive hearth, a roof on top of the side wall, over the hearth, and an arcing electrode depending through the roof concentrically and symmetrically with respect to the hearth. The hearth should have at least two electrical hearth connections positioned radially from the center of the hearth and symmetrically with respect to each other and the arcing electrode. A first DC power conductor should connect with the arcing electrode, and a second DC power conductor should connect with the electrically conductive hearth. It is understood that one conductor is positive and the other is negative, the latter usually being connected to the arcing electrode.

The invention comprises the first and second conductors extending from a position horizontally offset from the furnace, such as from the usual convertor below the furnace bottom to a point below the hearth and aligned vertically with the arcing electrode over the hearth. At this point the first conductor is formed into at least two branches which extend from the point horizontally in opposite directions to beyond the furnace side wall and then extend upwardly so as to jointly connect with the arcing electrode. The second conductor is also formed at the point into at least two branches which extend horizontally from the point in opposite directions with one branch connecting with one of the hearth connections and the other branch connecting with the other one of the hearth connections.

BRIEF DESCRIPTION OF THE DRAWING

The accompanying drawing shows somewhat schematically and in vertical section an electric arc furnace embodying the principles of this invention.

DETAILED DESCRIPTION OF THE INVENTION

In this drawing a furnace of the non-tilting type used for the direct reduction of iron oxide is illustrated.

It has a cylindrical side wall 1, a tubular consumable electrode 2 providing a metal-oxide feeding passage 3 and a circular roof 4 for the side wall 1 and through which the electrode 2 depends concentrically or coaxially with respect to the roof and side wall. The hearth below the electrode has the electrical conductive portion 5 forming an annular array coaxially or symmetrically around the axis of the electrode 2. The hearth may be constructed as disclosed by the previously mentioned U.S. Pat. Nos. 4,228,314 and 4,324,943.

The DC power supply for the furnace, such as a convertor C, is necessarily horizontally offset from the furnace so the positive and negative conductors 6 and 7 respectively extend from the position horizontally offset from the furnace in the form of straight or linear lengths to a point or position 8 below the hearth and aligned vertically with the electrode 2 above the hearth. At the point 8 the positive conductor 6 is formed into two branches which extend from the point as straight lengths horizontally and diametrically in opposite directions to beneath the electrically conductive hearth electrical connections 9. The patented electrically conductive hearth includes beneath its refractory construction a metal plate 9a connecting with the hearth's electrically conductive components, this plate having the hearth connections 9. The negative power line 7 at the point 8 is also formed into two branches comprising oppositely extending straight lengths which extend horizontally to beyond the furnace side wall 1, the branches then on opposite sides of the side wall extending as straight lengths vertically upwardly until above the furnace roof 4 where they respectively connect with flexible cables 10 suspended from the arcing electrode supporting beam assembly 2a used to control the vertical movement of the electrode. The electrode is consumable and therefore vertically movable so that it can be fed downwardly during the operation of the furnace.

In the drawing the negative conductor 7 is in front of and conceals the right hand branch of the conductor 6, and the left hand branch of the conductor 7 extends from the point 8 behind the left hand branch of the conductor 6 and is to that extent concealed from view.

When the furnace is in operation the electrode 2 is used to both feed and form the arc 12 with the melt 13 through the heavy layer of coke particles 14. The feed is with metal oxide particles through the top of the electrode 2, the usual feeder not being shown. The melt is high-carbon iron and by its carbon, maintained by the carbon particle layer 14, the metal oxide particles are reduced to metal, the furnace having a side wall tap hole (not shown) through which the melt continuously feeds from the furnace.

Arc angularity is prevented by the present invention because of the symmetrical current conductor system described. The positive conductor 6 extends horizontally straight below the furnace to the point 8 directly beneath the electrode 2, and then divides into two diametrically extending horizontal straight lengths so as to connect with the hearth connections 9. The negative conductor 7 also extends horizontally straight from its offset starting position, parallel to the corresponding lengths of the conductor 6, until at the point 8 the conductor 7 forms the two diametrically extending straight horizontal lengths until beyond the furnace wall 1 where the two branches of the conductor 7 extend straight vertically upwardly so as to connect with the suspension cables 10 and 11 which connect jointly with the electrode suspension arm 2a which extends from the electrode 2 with uniform horizontal lengths connecting with the suspension cables. The electrical system is symmetrical and the DC power carried can produce only symmetrical magnetic fields having no net effect on the arc 12.

The various conductor lengths can be suitably supported where necessary. If for some reason more than two hearth connections are desired they should be circumferentially interspaced as well as the branches of the negative conductor 7, this possibly requiring a special form of electrode assembly arm 2a.

What is claimed is:

1. A DC arc furnace comprising a side wall and an electrically conductive hearth, a roof on top of the side wall and over the hearth, an arcing electrode depending through the roof, a plurality of electrical hearth connections extending through the hearth symmetrically with respect to the arcing electrode and each other, a DC power supply at a position horizontally offset from the furnace, a negative DC power conductor connecting with the arcing electrode and a positive DC power conductor connecting with the hearth connections; wherein the improvement comprises both of the conductors connecting with and extending from said supply to a point below the hearth and aligned vertically with the electrode, the negative conductor forming at the point at least two branches which extend from the point horizontally in opposite directions to beyond the side wall and upwardly so as to jointly connect with the arcing electrode, the positive conductor forming at the point at least two branches which extend horizontally from the point in opposite directions with one branch connecting with the other one of the hearth connections and the other branch connecting with the other one of the hearth connections, the branch lines being symmetrically positioned relative to each other and to the arcing electrode and hearth connections, and the conductors and their branch lines being in the form of straight lengths.

* * * * *